(12) United States Patent
Bromer

(10) Patent No.: US 9,761,051 B2
(45) Date of Patent: Sep. 12, 2017

(54) OUT-OF FOCUS MICROMIRROR TO DISPLAY AUGMENTED REALITY IMAGES

(71) Applicant: Empire Technology Development LLC, Wilmington, DE (US)

(72) Inventor: Nicholas Sheppard Bromer, Marietta, PA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/362,583

(22) PCT Filed: Dec. 26, 2013

(86) PCT No.: PCT/US2013/077881
§ 371 (c)(1),
(2) Date: Jun. 3, 2014

(87) PCT Pub. No.: WO2015/099747
PCT Pub. Date: Jul. 2, 2015

(65) Prior Publication Data
US 2015/0187141 A1    Jul. 2, 2015

(51) Int. Cl.
*G06T 19/00* (2011.01)
*G02B 27/01* (2006.01)
*G02B 26/08* (2006.01)

(52) U.S. Cl.
CPC ........ *G06T 19/006* (2013.01); *G02B 26/0833* (2013.01); *G02B 27/017* (2013.01);
(Continued)

(58) Field of Classification Search
CPC ...... G02B 27/01; G02B 27/0172; G06T 19/00
(Continued)

(56) References Cited

U.S. PATENT DOCUMENTS

| 5,334,991 A | 8/1994 | Wells et al. |
| 7,986,315 B2 | 7/2011 | Sprague et al. |

(Continued)

FOREIGN PATENT DOCUMENTS

JP     1164782 A     3/1999

OTHER PUBLICATIONS

"Brother upgrades AiRScouter head mounted display," Accessed at http://web.archive.org/web/20130906175526/http://www.electronista.com/articles/12/04/17/airscouter.head.mounted.display.due.in.august/, Apr. 17, 2012, pp. 1-5.

(Continued)

*Primary Examiner* — Gregory J Tryder
*Assistant Examiner* — Michael Le
(74) *Attorney, Agent, or Firm* — Turk IP Law, LLC

(57) ABSTRACT

Technologies are generally described to display of an Augmented Reality (AR) image using a micromirror on an eyeglass. In some examples, AR data may be received at a controller coupled to a laser transmitter positioned on a surface of a frame of the eyeglass. The laser transmitter may transmit a laser signal modulated by the received AR data onto the micromirror positioned on, preferably, a proximal surface of a lens of the eyeglass. Concurrently, an electrical signal may be transmitted to a base of the micromirror causing the micromirror to oscillate in correlation with an intensity of the laser signal such that the AR image is created on a retina. In another embodiment, the laser signal modulated by the received AR data may be reflected from a plane mirror positioned on the proximal surface of the frame, forward to the laser transmitter, to transmit the laser signal onto the micromirror.

15 Claims, 8 Drawing Sheets

(52) U.S. Cl.
CPC .... *G02B 27/0172* (2013.01); *G02B 2027/014* (2013.01); *G02B 2027/0178* (2013.01)

(58) Field of Classification Search
USPC ........................................................ 345/633
See application file for complete search history.

(56) References Cited

U.S. PATENT DOCUMENTS

| | | | |
|---|---|---|---|
| 8,390,933 B2 | 3/2013 | Tanaka et al. | |
| 8,403,490 B2 | 3/2013 | Sugiyama et al. | |
| 8,817,379 B2* | 8/2014 | Saeedi | G02B 27/0172 359/201.1 |
| 9,250,444 B2* | 2/2016 | Magyari | G02B 27/0172 |
| 2003/0016906 A1* | 1/2003 | Utsunomiya | B81B 3/0062 385/18 |
| 2003/0201784 A1 | 10/2003 | Potter | |
| 2006/0226226 A1 | 10/2006 | Asai et al. | |
| 2006/0285078 A1* | 12/2006 | Kasazumi | G02B 26/101 353/37 |
| 2007/0257870 A1* | 11/2007 | Knipe | G02B 26/0841 345/84 |
| 2007/0268950 A1* | 11/2007 | Spinelli | G02B 26/0833 372/99 |
| 2009/0033884 A1* | 2/2009 | Yonekubo | G03B 21/2086 353/85 |
| 2009/0322861 A1* | 12/2009 | Jacobs | G02B 26/026 348/53 |
| 2010/0060551 A1* | 3/2010 | Sugiyama | G02B 27/0172 345/8 |
| 2010/0103077 A1* | 4/2010 | Sugiyama | G02B 27/017 345/8 |
| 2010/0110368 A1 | 5/2010 | Chaum | |
| 2011/0051076 A1* | 3/2011 | Sugihara | G02B 27/0172 351/158 |
| 2012/0105310 A1* | 5/2012 | Sverdrup | G02B 27/017 345/8 |
| 2013/0016033 A1* | 1/2013 | Latta | G06F 3/011 345/8 |
| 2013/0021373 A1 | 1/2013 | Vaught et al. | |
| 2013/0241805 A1 | 9/2013 | Gomez | |
| 2013/0249776 A1 | 9/2013 | Olsson et al. | |
| 2013/0300766 A1* | 11/2013 | Mukawa | G02B 27/0179 345/633 |

OTHER PUBLICATIONS

"Virtual retinal display," Accessed at http://web.archive.org/web/20140401232435/http://en.wikipedia.org/wiki/Virtual_retinal_display, accessed on May 30, 2014, pp. 1-14.

"Welcome to a world through Glass," Accessed at http://web.archive.org/web/20131225140656/http://www.google.com/glass/start/what-it-does/, accessed on May 30, 2014, pp. 1-7.

Davies, C., "Brother AiRScouter wearable displays launching Jun. 15," Accessed at http://web.archive.org/web/20130524000218/http://www.slashgear.com/brother-airscouter-wearable-displays-launching-june-15-17223265, Apr. 17, 2012, pp. 1-11.

Garcia, E., "Lemoptix Optical MEMS Scanning Micromirrors, the Solution of Choice for High-Definition Laser Printer Equipment," Lemoptix MEMS scanning micromirrors for laser printers—press release—Aug. 2011, pp. 1-3.

International Search Report and Written Opinion for International Application No. PCT/US2013/077881, mailed on Apr. 29, 2014.

Perlin, K., "Eccescopy, part 11," Accessed at http://blog.kenperlin.com/?p=5014, Nov. 11, 2010, pp. 1-3.

Iguchi, T., "Telepathy One—SXSW Interactive 2013," Accessed at http://web.archive.org/web/20131021183814/http://www.youtube.com/watch?v=tLje1fwrjcU, published on Mar. 20, 2013, pp. 1-2.

\* cited by examiner

COMPUTER PROGRAM PRODUCT 800

SIGNAL-BEARING MEDIUM 802

804 AT LEAST ONE OF
  ONE OR MORE INSTRUCTIONS TO RETRIEVE AR DATA TO BE DISPLAYED AT A CONTROLLER COUPLED TO A LASER TRANSMITTER POSITIONED ON A PROXIMAL SURFACE OF A FRAME OF AN EYEGLASS;
  ONE OR MORE INSTRUCTIONS TO TRANSMIT A LASER SIGNAL MODULATED BY THE RECEIVED AR DATA ONTO A MICROMIRROR POSITIONED ON A PROXIMAL SURFACE OF A LENS OF THE EYEGLASS;
  ONE OR MORE INSTRUCTIONS TO OPTIONALLY REFLECT THE LASER SIGNAL OFF A PLANE MIRROR TO TRANSMIT THE LASER SIGNAL ONTO A MICROMIRROR; AND
  ONE OR MORE INSTRUCTIONS TO TRANSMIT AN ELECTRICAL SIGNAL TO A BASE OF THE MICROMIRROR TO CAUSE THE MICROMIRROR TO OSCILLATE IN CORRELATION WITH AN INTENSITY OF THE LASER SIGNAL SUCH THAT AN AR IMAGE IS CREATED ON A RETINA.

| COMPUTER-READABLE MEDIUM 806 | RECORDABLE MEDIUM 808 | COMMUNICATIONS MEDIUM 810 |

OUT-OF FOCUS MICROMIRROR TO DISPLAY AUGMENTED REALITY IMAGES

CROSS-REFERENCE TO RELATED APPLICATION

This Application is the U.S. National Stage filing under 35 U.S.C. §371 of International Application No. PCT/US13/77881, filed on Dec. 26, 2013. The International Application is herein incorporated by reference in its entirety.

BACKGROUND

Unless otherwise indicated herein, the materials described in this section are not prior art to the claims in this application and are not admitted to be prior art by inclusion in this section.

Augmented Reality (AR) is a live view of a physical, real-world environment with elements augmented by a technology generated sensory input, such as audio, video, or graphics. Some AR technologies that generate graphic inputs may achieve display of AR images by scanning a laser signal directly into an eye. The laser signal may include parallel rays enabling the eye to focus on the laser signal in a manner similar to the way that the eye may focus on a point at infinity. As a result, the eye may be focused near infinity, while simultaneously seeing a sharp image from the laser signal scanned directly into the eye. However, current apparatuses used to display AR images may often be expensive, obtrusive, and incompatible with existing eyewear (e.g., eyeglasses and/or sunglasses).

SUMMARY

The present disclosure generally describes techniques to display an Augmented Reality (AR) image.

According to some examples, a method to display an Augmented Reality (AR) image is provided. An example method may include receiving AR data to be displayed at a controller coupled to a laser transmitter positioned on a surface of a frame or temple of an eyeglass. The method may also include transmitting a laser signal, modulated according to the received AR data, onto a micromirror positioned on a proximal surface of a lens of the eyeglass. The method may further include transmitting an electrical signal to the micromirror to cause the micromirror to oscillate in correlation with an intensity of the laser signal such that the AR image is projected onto a retina.

According to other examples, an apparatus to display an Augmented Reality (AR) image is described. An example apparatus may include a controller configured to receive AR data, an eyeglass, and a laser transmitter mounted on a surface of a frame or temple of the eyeglass and communicatively coupled to the controller. The laser transmitter may be configured to transmit a laser signal, modulated according to the received AR data, onto a micromirror. The example apparatus may also include a lens of the eyeglass, where the micromirror may be positioned on a proximal surface of the leas close to an eye of a wearer and outside of a visual focus of the wearer.

According to further examples, a method to produce an eyeglass that displays an Augmented Reality (AR) image through a micromirror on the eyeglass is provided. An example method may include mounting a laser transmitter on a proximal surface of a frame of the eyeglass, the laser transmitter coupled to a controller configured to receive AR data to be displayed. The laser transmitter may be configured to transmit a laser signal modulated based on the received AR data onto the micromirror, and the controller may be configured to transmit an electrical signal to abuse of the micromirror to cause the micromirror to oscillate. The example method may also include mounting the micromirror on a proximal surface of a lens at a position close to an eye of a wearer and outside of a visual focus of the wearer. The micromirror may be configured to oscillate in correlation with an intensity of the laser signal such that the AR image is created on a retina of the wearer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
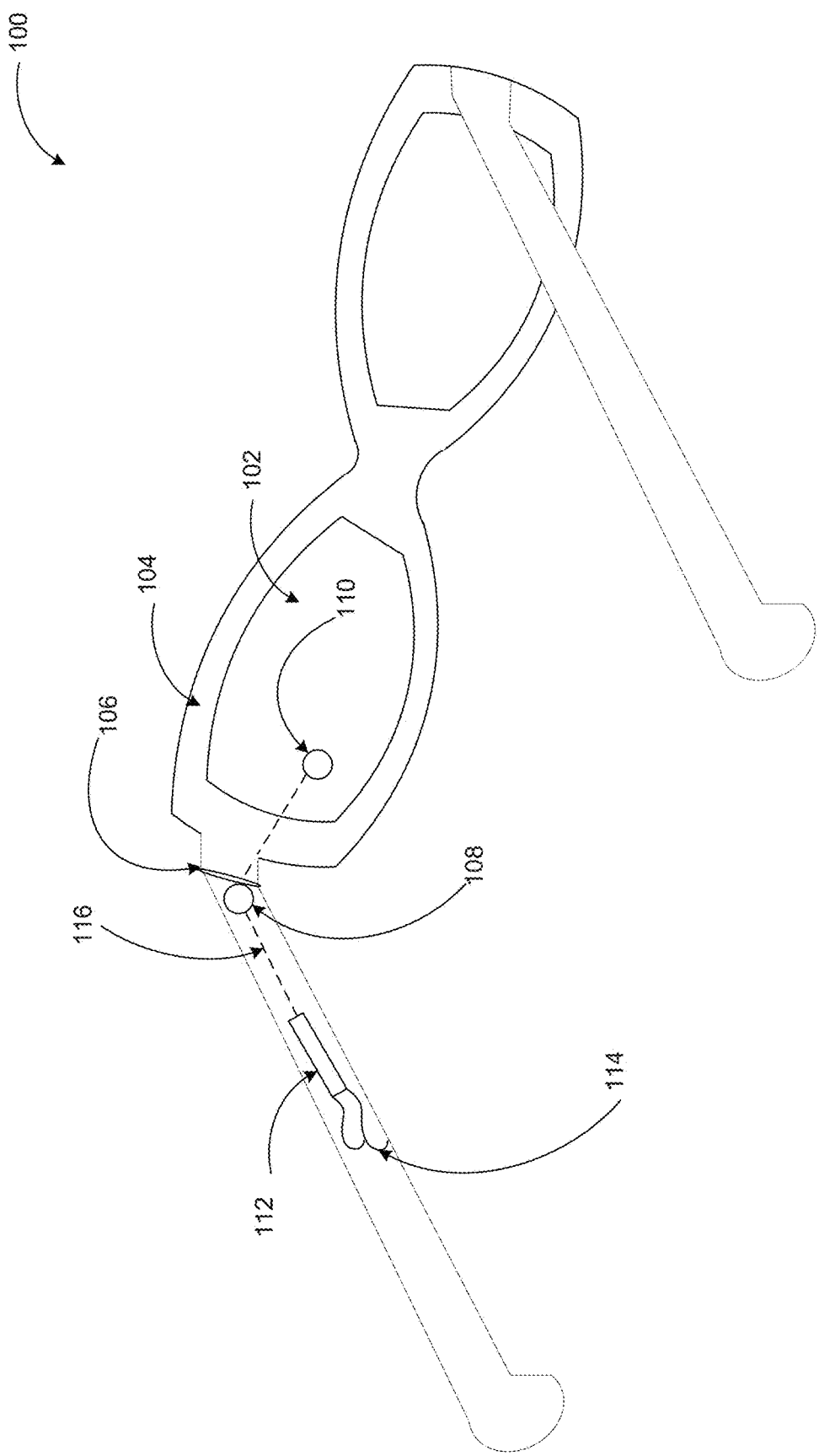
FIG. 1 illustrates an example apparatus suitable to display an Augmented Reality (AR) image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter cilia, to methods, apparatus, systems, devices, and/or computer program products related to display of an Augmented Reality (AR) image.

Briefly stated, technologies are generally described to display of an Augmented Reality (AR) image using a micromirror on an eyeglass. In some examples, AR data may be received at a controller coupled to a laser transmitter positioned on a surface of a frame of the eyeglass. The laser transmitter may transmit a laser signal modulated by the received AR data onto the micromirror positioned on, preferably, a proximal surface of a lens of the eyeglass. Concurrently, an electrical signal may be transmitted to a base of the micromirror causing the micromirror to oscillate in correlation with an intensity of the laser signal such that the AR image is created on a retina. In another embodiment, the laser signal modulated by the received AR data may be reflected from a plane mirror positioned on the proximal surface of the frame, forward to the laser transmitter, to transmit the laser signal onto the micromirror.

FIG. 1 illustrates an example apparatus suitable to display an AR image, arranged in accordance with at least some embodiments described herein.

The laser transmitter 112 may be coupled to a controller 114 to receive AR data. Although not illustrated in the diagram 100, the controller 114 may receive the AR data from a remote unit such as a server, a personal computing device, a recorder, or similar sources of AR data. The controller 114 may communicate with the remote unit via a wireless link. The laser transmitter 112 may then transmit a laser signal modulated with the received AR data onto the micromirror 110. In an alternate embodiment, the laser transmitter 112 may transmit the laser signal modulated with the received AR data onto the micromirror by reflecting the laser signal at a predefined angle from the plane mirror 108 such that the laser signal is reflected substantially entirely. Due to the configuration of the apparatus, the predefined angle is approximately 90 degrees. The controller 114 may concurrently transmit an electrical signal through wires or strips integrated into the frame and/or the lens 102 (or the surface of the lens 102) of the eyeglass (not shown in FIG. 1) to a base of the micromirror 110 to cause the micromirror 110 to rotate (for example, to oscillate or sweep angularly in some repeating pattern such as sinusoidal, saw-tooth, etc.) such that the AR image is projected onto a retina. In some examples, the electrical signal may be selected (e.g., in frequency and/or in amplitude) to be in correlation with an intensity of the laser signal. The electrical signal may cause the micromirror 110 to sweep through a series of positions, and the laser may be modulated to create an image for the viewer by firing when the laser is pointing at the part of the retina where a bright spot appears in the projected image. The oscillation of the micromirror through alternation of charges induced by the electrical signal transmitted by the controller 114 is described in more detail below.

AR technologies achieve display of AR images by scanning a laser signal directly into an eye of a wearer. The laser signal may include parallel rays enabling the eye to focus on the signal in a similar way that the eye may focus on a point at infinity. As a result, the eye may be focused near infinity, while simultaneously seeing a sharp image from the laser signal scanned directly into the eye. If a scanning laser located sufficiently far away from the eye is scanned over the iris, the AR image may appear as an almost-stationary point, because the laser signal may arrive at nearly the same place on the retina. However, if the same scanning laser is moved to a position very close to the eye, such as the micromirror 110 positioned on the proximal surface of the lens 102, and scanned over the iris at various angles, the AR image may appear to be moving over a substantial distance. The AR image may appear to be moving over a substantial distance because the rays of the laser signal may change their position on the retina as the laser signal angle changes, providing a wider angular display. The close position of the micromirror 110 to the eye may also prevent visibility of the micromirror 110 to the wearer, other than a minor blur. By being sufficiently close to the eye, the micromirror 110 may be out of focus to the wearer's eye, which is generally focused on far away objects and is incapable of focusing to such a close distance. To prevent distraction from the minor blur, the micromirror 110 may preferably be positioned outside of the region of the eyeglass lens 102 through which the user normally looks, i.e., the region of the lens 102 employed when looking "straight-ahead" (or, the center of the user's visual field).

In some embodiments, the plane mirror 108 may be slightly concave and the micromirror 110 may be slightly convex. A laser signal generally has a diameter slightly less than one millimeter. However, the laser signal may be compressed to a smaller diameter by reflecting from a slightly concave mirror. Accordingly, if the plane mirror 108 has a concave curvature, then the laser signal may arrive at the micromirror 110 having a smaller diameter, allowing the micromirror 110 to be smaller in diameter, less visible to the wearer, and less obtrusive. The micromirror 110 may be convex to make the laser beam again cylindrical rather than conical and to thereby keep the laser signal in focus for an eye focused at infinity, enabling the rays from the micromirror into the eye to be collimated and thereby represent a point at infinity.

In other embodiments, at least one other laser transmitter and one other micromirror may be positioned on another tens of the eyeglass to create the AR image, where the transmitted laser signal and the transmitted electrical signal may be coordinated to enable stereoscopic vision. One or more micromirrors may also be positioned around a center of a wearer's visual field in distinct locations on each respective eyeglass lens to prevent overlap in a visual field of the wearer. Furthermore, multiple laser transmitters may be employed to emit multiple primary colors to create a color AR image. For example, the laser transmitters may emit red, blue, or green laser beams to create the color AR image.

Figure 2:
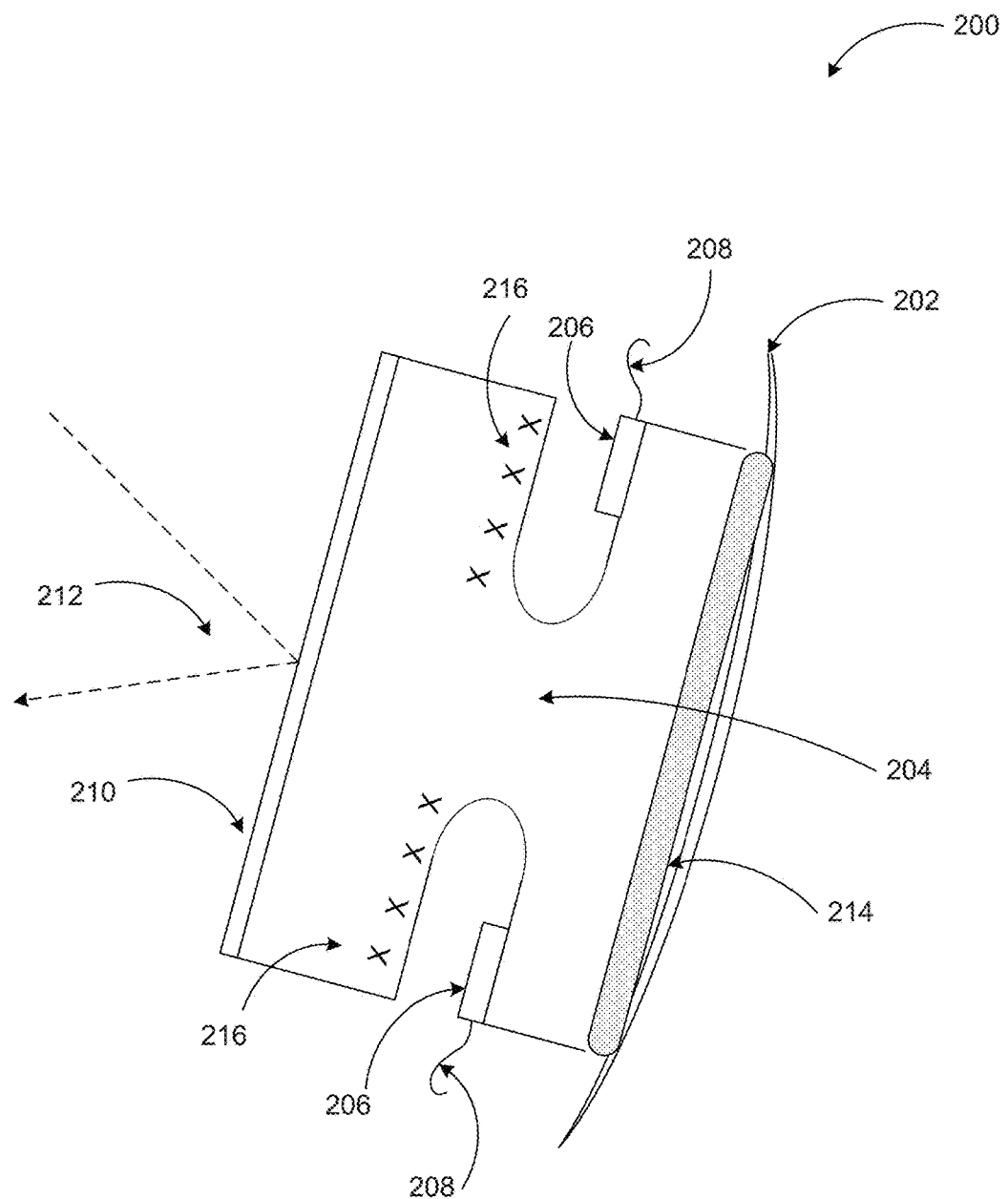
FIG. 2 illustrates an example micromirror on a proximal surface of a lens of an eyeglass.

FIG. 2 illustrates an example micromirror on a proximal surface of a lens of an eyeglass, arranged in accordance with at least some embodiments described herein.

As shown in a diagram 200, a non-reflective surface of an example micromirror 204 may be attached to a proximal surface of a lens 202 of an eyeglass using an adhesive material 214. Alternately, the micromirror 204 may be incorporated into the proximal surface of the lens 202 to form a single lens piece. The micromirror 204 may be positioned outside of a wearer's visual focus and at a distance between an eye of the wearer and the micromirror that is, for example, substantially equal to a length of a longest eyelash of the wearer to achieve a position close to the eye.

The reflective surface 210 of the micromirror 204 may be plane or slightly convex and may enable a modulated laser signal 212 to be scanned into an eye of a wearer. The micromirror 204 may be plane or convex to keep the modulated laser signal 212 in focus for the eye focused at infinity, enabling the rays of the laser signal from the micromirror into the eye to be collimated and thereby represent a point at infinity. The micromirror may include two or more pairs of electrode plates orthogonally positioned on the micromirror 204. An example pair of electrode plates 206 is illustrated in FIG. 2. The two or more pairs of electrode plates may receive electrical signals from the controller 114 discussed in FIG. 1 through leads 208. The signals (voltages) from the controller 114 may induce charges 216 in the electrode plates 206, which may cause them to be attracted or repelled from charge in the body of the micromirror 204. The charge may be, for example, in regions of the body of the micromirror 204 that may be permanently charged negatively by injecting high-speed electrons into them (indicated by "x" marks in FIG. 2); or, the body of the micromirror 204 may be permanently charged by performing resin molding of the body of the micromirror 204 in an electrically-charged environment; or, the body may be impermanently charged by applying a DC voltage to the body of the micromirror 204. If the charges of the body 204 are of a single polarity, then, if the two leads 208 are conducting an AC voltage to drive the two electrode plates 206, at each moment of the AC cycle one of the two electrode plates 206 may be attracted to the body, and the other repelled from it; and a moment later, the attraction and repulsion may be reversed, creating a periodic torque that my tend to rotate the specular portion of the body of the micromirror 204. The rotation may be either by direct action bending the body of the micromirror 204 or by reinforcing a mechanical oscillation of the body which occurs due to the elastic nature of the body of the micromirror 204, its mass, and the reduced cross section of the un-labeled "neck" portion of less cross section. Besides the arrangement shown in FIG. 2, embodiments may also include a micromirror with a single electrode plate, although such an arrangement may produce lower torque. Further example embodiments may include arrangements, where one or more electrodes face opposite permanent charges.

Figure 3:
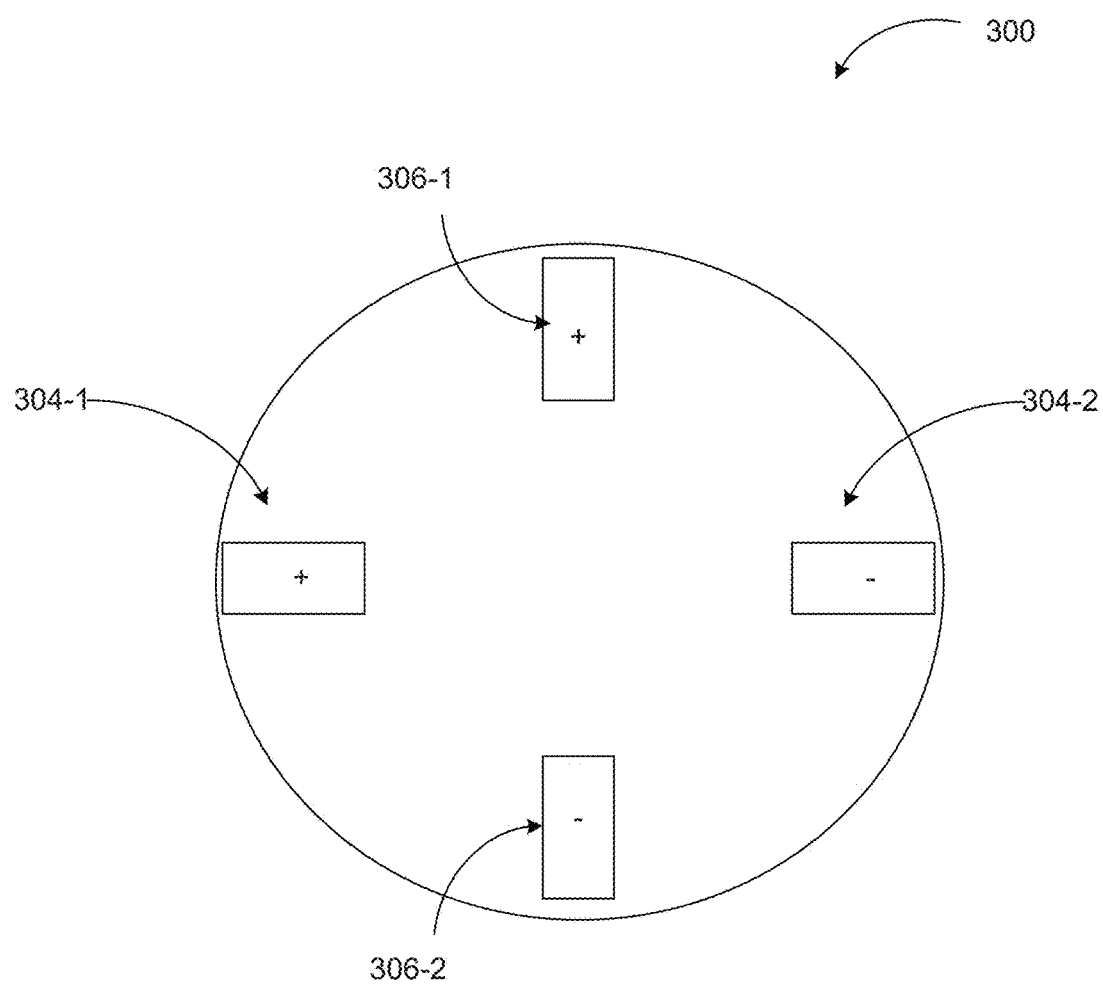
FIG. 3 illustrates an example configuration of one or more electrode plates of a micromirror.

In some examples, the body of the micromirror 204 may oscillate mechanically along one axis perpendicular to one set of electrode plates 206, and may be damped or oscillate with a different frequency along another axis perpendicular to a second set of electrode plates 206 (not shown in FIG. 2, see FIG. 3). If these two axes are perpendicular and one oscillation is slower than the other is, then the direction of the laser beam may sweep out a raster pattern, somewhat like that in a television cathode ray tube. Thus, the electrical signals may enable the micromirror 204 to oscillate at the AC frequency or frequencies from the controller 114, and the sweep of the micromirror can be put into correlation with an intensity of laser signals transmitted by a laser transmitter such that an AR image is projected onto a retina, somewhat like a laser projector. Two opposing pairs of electrode plates may be configured to receive different alternating current (AC) signals, causing the micromirror to sweep in two directions rather than just one as mentioned above. In each direction, one electrode pulls and the other electrode pushes within each of the electrode pairs. Either or both directions of deflection may be resonant, or both may respond directly to an input voltage without resonant oscillation, or a combination may be used.

In some examples, the micromirror 204 may have an elliptical outline as seen in a direction perpendicular to the micromirror's reflecting surface and a circular outline along the laser signal direction and the direction of the reflected laser signal beam. The circular outline along the signal direction may have a diameter roughly equal to a diameter of the laser signal (e.g., 1 millimeter or less), so that the micromirror 204 may intercept and reflect a substantial portion of light in the laser signal to the eye. The micromirror 204 may be composed of an insulating material, such as a resin with an aluminum silicon, or glass coating 210, for example, which resin may allow the micromirror to retain the electric charges permanently embedded into the micromirror for the purpose of attracting and repelling the voltage-induced charges in the electrode plates 206.

FIG. 3 illustrates an example configuration of one or more electrode plates of a micromirror, arranged in accordance with at least some embodiments described herein.

As shown in a diagram 300, an example micromirror may include two or more pairs of electrode plates 304, 306 orthogonally positioned on the micromirror. These plates are exemplary of the electrode plates 206 in FIG. 2, as seen from above.

Figure 4:
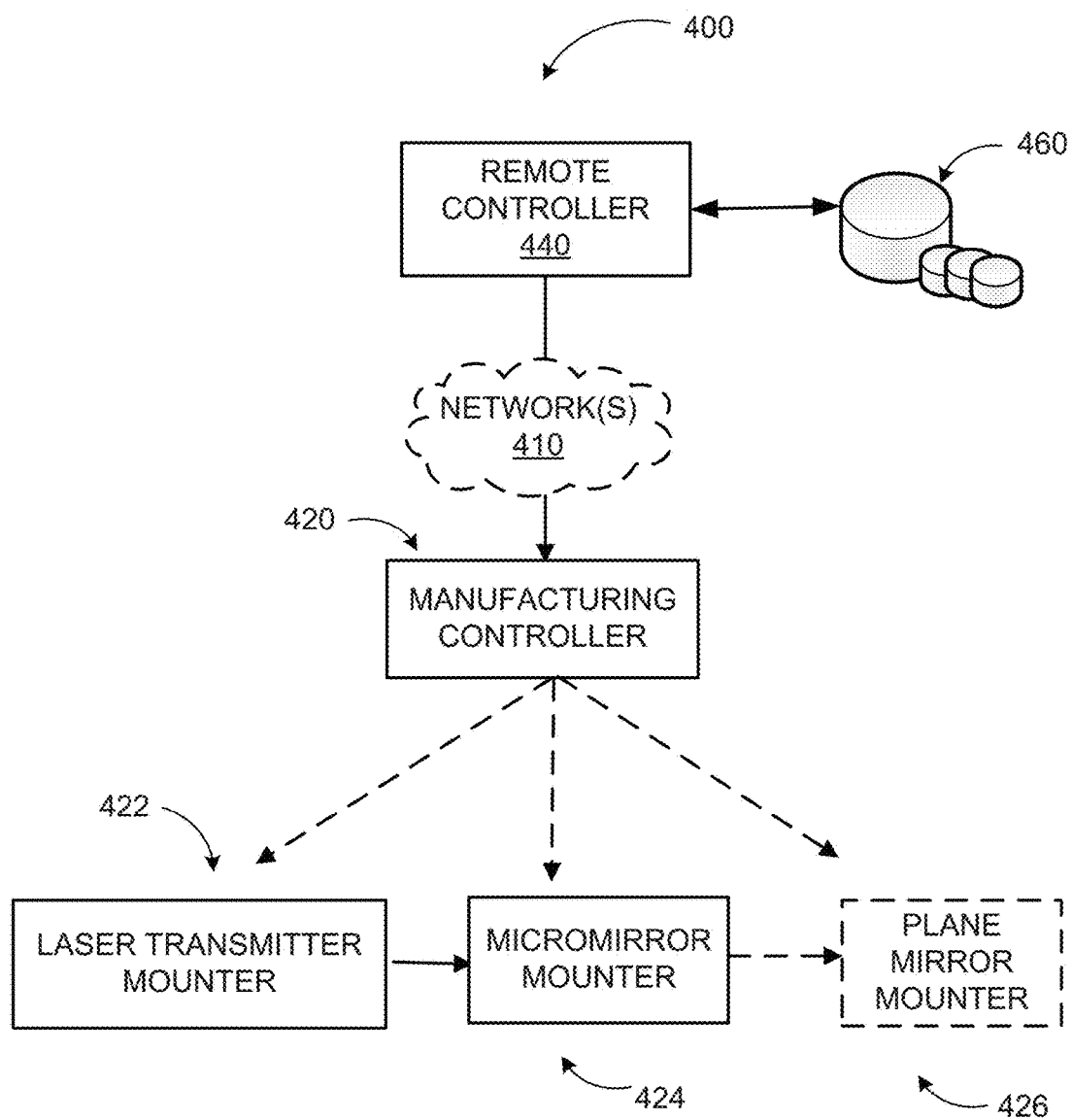
FIG. 4 illustrates an example system to produce an eyeglass that displays an AR image through a micromirror on the eyeglass.

FIG. 4 illustrates an example system 400 to produce an eyeglass that displays an Augmented Reality (AR) image through a micromirror on the eyeglass, arranged in accordance with at least some embodiments described herein.

As depicted, the system 400 may include a manufacturing controller 420, a laser transmitter mounter 422, a micromirror mounter 424, and an optional plane mirror mounter 426. The manufacturing controller 420 may be operated by human control, or may be directed by a remote controller 440 via a network 410. The network 410 may comprise any topology of servers, clients, Internet service providers, and communication media, where the topology may be static or dynamic. The network 410 may include secure networks such as an enterprise network, an unsecure network such as a wireless open network, or the Internet. The network 410 may also coordinate communication over other networks such as Public Switched Telephone Network (PSTN) or cellular networks. Furthermore, the network 410 may include short range wireless networks such as Bluetooth or similar ones. By way of example, and not limitation, the network 410 may include wireless media such as acoustic, radio frequency (RF), infrared and other wireless media. Data associated with controlling the different processes of production may be stored at and/or received from data stores 460.

The laser transmitter mounter 422 may preferably mount a laser transmitter on a proximal surface of a temple or frame of an eyeglass, where it may be largely hidden. The laser transmitter mounter 422 may position the laser transmitter in front of a hinge on the frame of the eyeglass if the laser transmitter is configured to directly transmit the laser signal onto a micromirror. Alternately, the laser transmitter mounter 422 may position the laser transmitter further back on the temple of the eyeglass (the arms, hinged to the frame, that lie near a temple of a wearer) if the laser transmitter is configured to reflect the laser signal from a plane mirror onto the micromirror. The micromirror mounter 424 may mount the micromirror on a proximal surface of a lens of the eyeglass at a position close to an eye of a wearer and outside of a visual focus of the wearer. The micromirror mounter 424 may position the micromirror on the lens such that a distance between the eye of the wearer and the micromirror is substantially equal to a length of a longest eyelash of the wearer, or less. The micromirror mounter 424 may attach the micromirror to the lens using a suitable adhesive or may incorporate the micromirror into the proximal surface of the lens to form a single lens piece. In some embodiments, a plane mirror may be configured to reflect the laser signal from the laser transmitter onto the micromirror. The plane mirror mounter 426 may mount the plane mirror on a proximal surface of the frame near a hinge of the eyeglass forward from the laser transmitter. In further embodiments, an existing eyeglass or sunglass may be retrofitted using the above described system 400. The plane mirror mounter 426 may be aligned with the frame of the eyeglass in such a way that a center point on the interior of the eyeglass lens (which may be on the optical axis of the lens), through which the user's gaze will pass when the user is looking "straight ahead", is known to, or determined by, the plane mirror mounter 426. The plane mirror mounter 426 may mount the plane mirror at a point on the inside of the lens that is removed from this center point or optical axis by a predetermined distance, and which is removed from the center point along a certain direction at a predetermined angle to some reference, such as downward. The micromirror mounter 424 may include one or more components for adjusting the mirror angle to bounce a laser beam from the laser toward the plane mirror on the lens and for holding that angle permanently or semi-permanently. The laser transmitter mounter may also include one or more components for adjusting, and/or permanently or semi-permanently locking the angle of the laser transmitter, such that the laser beam correctly encounters the other mirrors and is directed onto the retina at the desired location. The laser transmitter mounter 422, the micromirror mounter 424, and the plane mirror mounter 426 all may include jigs, fixtures, and mechanical adjustment devices that can be operated manually, or by machine or computer control.

The examples provided in the description of FIGS. 1 through 4 have been described using specific methods, apparatuses, and configurations to display an AR image through a micromirror on an eyeglass. Embodiments to display an AR image through a micromirror on an eyeglass are not limited to the specific methods, apparatuses, and configurations according to these examples.

Figure 5:
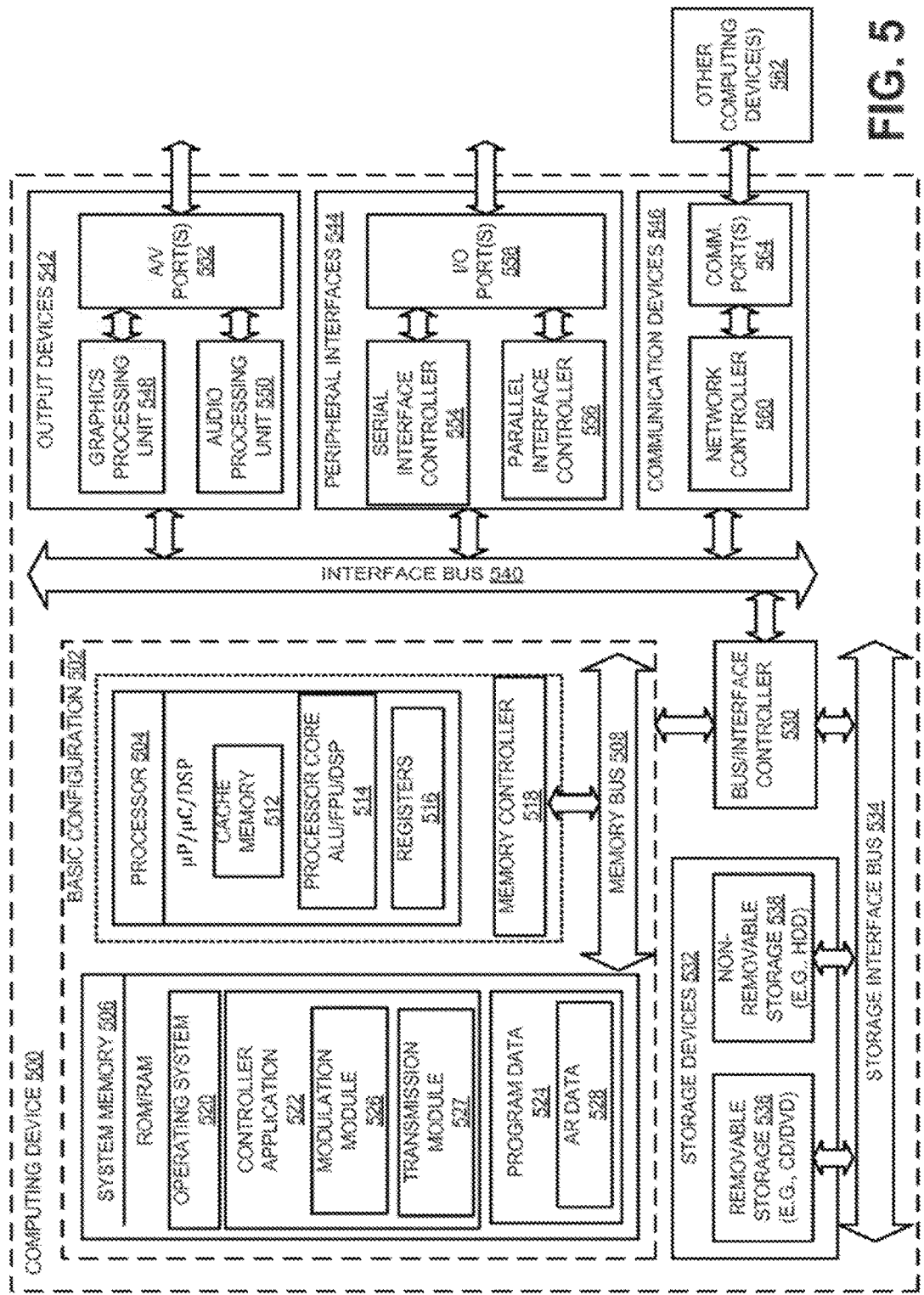
FIG. 5 illustrates a general purpose computing device, which may be used to display an AR image through a micromirror on an eyeglass.

FIG. 5 illustrates a general purpose computing device, which may be used to display an AR image through a micromirror on an eyeglass, arranged in accordance with at least some embodiments described herein.

For example, the computing device 500 may be used to display an AR image through a micromirror on an eyeglass, as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including hut not limited to a microprocessor (µP), a microcontroller (µC), a digital signal processor (DSP), or any combination thereof. The processor 504 may include one or more levels of caching, such as a cache memory 512, one or more processor cores 514, and registers 516. The example processor cores 514 may (each) include an arithmetic logic unit (ALU), a floating point unit (FPU), a digital signal processing core (DSP core), or any combination thereof. An example memory controller 518 may also be used with the processor 504, or in some implementations, the memory controller 518 may be an internal part of the processor 504.

Depending on the desired configuration, the system memory 506 may be of any type including hut not limited to volatile memory (such as RAM), non-volatile memory (such as ROM, flash memory, etc.) or any combination thereof. The system memory 506 may include an operating system 520, a controller application 522, and program data 524. The controller application 522 may include a modulation module 526 and a transmission module 527. The modulation module 526 may modulate a laser signal with AR data to be displayed. The transmission module 527 may transmit the modulated laser signals onto a micromirror. The transmission module 527 may further transmit electrical signals to abuse of the micromirror to cause the micromirror to oscillate in correlation to an intensity of the laser signal such that an AR image is created on the retina. The program data 524 may include, among other data, AR data 528 related to the AR image that is to be displayed, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. For example, the A/V ports 552 may send signals from the graphics processing unit 548 (acting in a manner similar to the controller 114 of FIG. 1) that control the angular sweeping of the micromirror 110, the modulation of the laser transmitter (112 in FIG. 1), and the correlation of the sweeping and the modulation to create a pattern of light on the retina and a virtual image for the user. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to display an AR image through a micromirror on an eyeglass. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
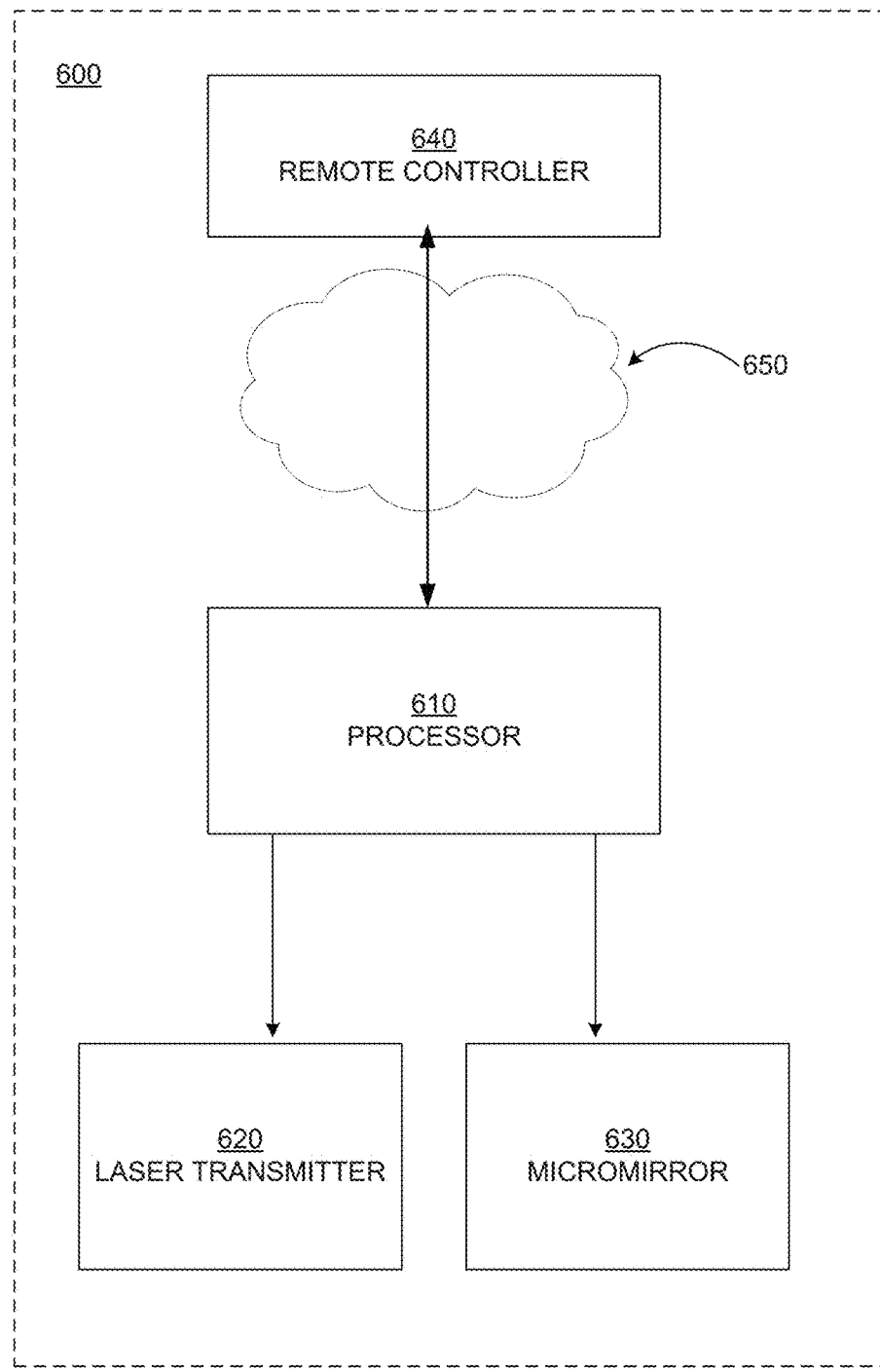
FIG. 6 illustrates a processor, which may be used to display an AR image through a micromirror on an eyeglass.

FIG. 6 illustrates a processor, which may be used to display an AR image through a micromirror on an eyeglass, arranged in accordance with at least some embodiments described herein.

In some embodiments, a processor 610 may be implemented as part of controller 114 or the remote unit described in FIG. 1. As depicted, a system 600 may include a remote controller 640 operably coupled to the processor 610 via a cloud 650. The processor 610 may be further coupled to a laser transmitter 620 and a micromirror 630. In some embodiments, the processor 610 may be integrated with the controller 114 as mentioned above. In other embodiments, the processor 610 may be a separate device. The processor 610 and the remote controller 640 may communicate via the cloud 650 by various means, such as by wired connections or wireless connections. The system 600 may also include additional items such as memory, a router, network interface logic, etc.

The processor 610 may be configured to undertake various methods, functional operations, actions, or blocks such as those described previously for FIGS. 1 to 3. For example, the processor 610 may receive AR data to be displayed from the remote controller 640 and transmit via the laser transmitter 620 a laser signal modulated based on the received AR data onto a micromirror 630. The processor 610 may also receive electrical signals from the remote controller 640 to transmit to a base of the micromirror 630 to enable the micromirror 630 to oscillate in correlation with an intensity of the laser signal transmitted by the laser transmitter 620 such that an AR image is projected onto a retina.

Figure 7:
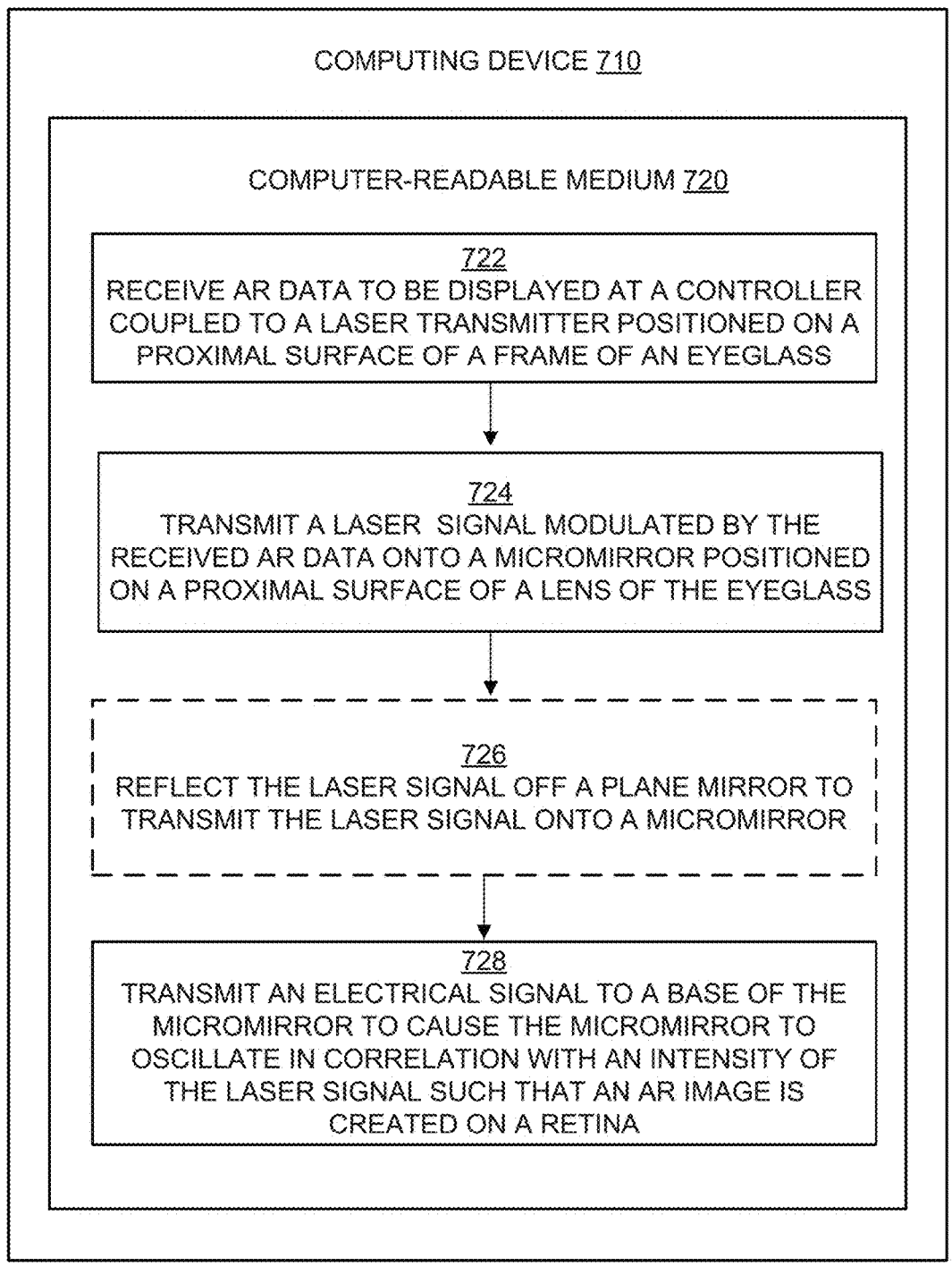
FIG. 7 is a flow diagram illustrating an example method to display an AR image through a micromirror on an eyeglass that may be performed by a computing device such as the computing device in FIG. 5 or a processor such as the processor in FIG. 6.

FIG. 7 is a flow diagram illustrating an example method to display an AR image through a micromirror on an eyeglass that may be performed by a computing device such as the computing device in FIG. 5 or a processor such as the processor in FIG. 6, arranged in accordance with at least some embodiments described herein.

Example methods may include one or more operations, functions or actions as illustrated by one or more of blocks 722, 724, 726, and/or 728. The operations described in the blocks 722 through 728 may also be stored as computer-executable instructions in a computer-readable medium such as a computer-readable medium 720 of a computing device 710. The computer-executable instructions may be executed by the computing device 710 in order to display an AR image to perform the operations of FIG. 7.

An example process to display an AR image may begin with block 722, "RECEIVE AR DATA TO BE DISPLAYED AT A CONTROLLER COUPLED TO A LASER TRANSMITTER POSITIONED ON A PROXIMAL SURFACE OF A FRAME OF AN EYEGLASS," where a controller (the controller 114) may be further coupled to a remote unit, a wireless link, or a recorder to receive the AR data to be displayed.

Block 722 may be followed by block 724, "TRANSMIT A LASER SIGNAL MODULATED BY THE RECEIVED AR DATA ONTO A MICROMIRROR POSITIONED ON A PROXIMAL SURFACE OF A LENS OF TI-IF EYEGLASS," where a laser transmitter (e.g., the laser transmitter 112) coupled to the controller may transmit a laser signal modulated by the received AR data onto a micromirror (e.g., the micromirror 110) positioned on a proximal surface of a lens of an eyeglass (e.g., the lens 102 of the eyeglass). The micromirror may be positioned outside of a wearer's visual focus at a distance between an eye of the wearer and the micromirror that is substantially equal to a length of a longest eyelash of the wearer.

Block 724 may be followed by optional block 726, "REFLECT THE LASER SIGNAL OFF A PLANE MIRROR TO TRANSMIT THE LASER SIGNAL ONTO A MICROMIRROR," where in some embodiments, the laser transmitter may reflect the laser signal at a predefined angle off a plane mirror (e.g., the plane mirror 108) such that the laser signal is reflected entirely. The plane mirror may have a convex reflective surface and may be positioned on the proximal surface of a frame (e.g., the frame 104 of the eyeglass), forward to the laser transmitter and near a hinge (e.g., the hinge 106) of the eyeglass.

Block 726 may be followed by block 728, "TRANSMIT AN ELECTRICAL SIGNAL TO A BASE OF THE MICROMIRROR TO CAUSE THE MICROMIRROR TO OSCILLATE IN CORRELATION WITH AN INTENSITY OF THE LASER SIGNAL SUCH THAT AN AR IMAGE IS CREATED ON A RETINA," where the controller may concurrently transmit an electrical signal to a base of the micromirror composed of one or more wires or strips of conductive material (e.g., the one or more leads 116) to cause the micromirror to oscillate in correlation with an intensity of the laser signal such that the AR image is projected onto a retina.

The blocks included in the above described process are for illustration purposes. AR image display may be implemented by similar processes with fewer or additional blocks. In some embodiments, the blocks may be performed in a different order. In some other embodiments, various blocks may be eliminated. In still other embodiments, various blocks may be divided into additional blocks, supplemented with other operations, or combined together into fewer blocks.

FIG. 8 illustrates a block diagram of an example computer program product, arranged in accordance with at least some embodiments described herein.

In some embodiments, as shown in FIG. 8, the computer program product 800 may include a signal bearing medium 802 that may also include one or more machine readable instructions 804 that, when executed by, for example, a processor, may provide the functionality described herein. Thus, for example, referring to the processor 504 in FIG. 5, a modulation module 526 and a transmission module 527 executed on the processor 504 may undertake one or more of the tasks shown in FIG. 8 in response to the instructions 804 conveyed to the processor 504 by the signal bearing medium 802 to perform actions associated with establishing secure communications to manage components of a control system as described herein. Some of those instructions may include, for example, instructions to retrieve AR data to be displayed at a controller coupled to a laser transmitter positioned on a proximal surface of a frame of an eyeglass, transmit a laser signal modulated by the received AR data onto a micromirror positioned on a proximal surface of a lens of the eyeglass, optionally reflect the laser signal off a plane mirror to transmit the laser signal onto a micromirror, and transmit an electrical signal to a base of the micromirror to cause the micromirror to oscillate in correlation with an intensity of the laser signal such that an AR image is created on a retina, according to some embodiments described herein.

In some implementations, the signal bearing medium 802 depicted in FIG. 8 may encompass a computer-readable medium 806, such as, but not limited to, a hard disk drive (HDD), a solid state drive (SSD), a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, the computer program product 800 may be conveyed to one or more modules of the processor 504 of FIG. 5 by an RF signal bearing medium, where the signal bearing medium 802 is conveyed by the wireless communications medium 810 (e.g., a wireless communications medium conforming with the IEEE 802.11 standard).

According to some examples, a method to display an Augmented Reality (AR) image is provided. An example method may include receiving AR data to be displayed at a controller coupled to a laser transmitter positioned on a surface of a frame or temple of an eyeglass. The method may also include transmitting a laser signal, modulated according to the received AR data, onto a micromirror positioned on a proximal surface of a lens of the eyeglass. The method may further include transmitting an electrical signal to the micromirror to cause the micromirror to oscillate in correlation with an intensity of the laser signal such that the AR image is projected onto a retina.

In other examples, transmitting the laser signal onto the micromirror may include reflecting the laser signal from a plane mirror, positioned on the proximal surface of the frame forward from the laser transmitter, to the micromirror. The laser signal may be reflected at a predefined angle from the plane mirror to the micromirror such that the laser signal is reflected entirely. The micromirror may be positioned on the lens such that a distance between an eye of a wearer and the micromirror is substantially equal to a length of a longest eyelash of the wearer. The micromirror may further be positioned outside of a visual focus of a wearer.

According to some embodiments, an apparatus to display an Augmented Reality (AR) image is described. An example apparatus may include a controller configured to receive AR data, an eyeglass, and a laser transmitter mounted on a surface of a frame or temple of the eyeglass and communicatively coupled to the controller. The laser transmitter may be configured to transmit a laser signal, modulated according to the received AR data, onto a micromirror. The example apparatus may also include a lens of the eyeglass, where the micromirror may be positioned on a proximal surface of the lens close to an eye of a wearer and outside of a visual focus of the wearer.

In other embodiments, a base of the micromirror may be configured to receive an electrical signal transmitted by the controller and to oscillate in response to the electrical signal in correlation with an intensity of the laser signal such that the AR image is created on a retina. The controller may be further coupled to a remote unit, a wireless link, or a recorder to receive the AR data. The laser transmitter may be positioned in front of a hinge on the frame of the eyeglass when the laser transmitter is configured to directly transmit the laser signal to the micromirror. A plane mirror may be mounted on a proximal surface of the frame, the plane mirror configured to entirely reflect the transmitted laser signal at a predefined angle from the laser transmitter to the micromirror. A reflective surface of the plane mirror may be concave and a reflective surface of the micromirror may be convex.

In further embodiments, the micromirror may be attached to the proximal surface of the lens with an adhesive material or incorporated into the proximal surface of the lens to form a single lens piece. The micromirror may be positioned on the lens such that a distance between an eye of the wearer and the micromirror is substantially equal to a length of a longest eyelash of the wearer. The micromirror may be composed of insulating material and a non-reflective surface of the micromirror may be embedded with electric charges. The micromirror may comprise two pairs of electrode plates orthogonally positioned on the micromirror, where the electrode plates of each orthogonally positioned pair may be coupled to alternating current signals to enable oscillation of the micromirror. The base of the micromirror may be electrically coupled to one or more wires or one or more strips of conductive material.

In yet further embodiments, the apparatus may also include another laser transmitter and/or another micromirror mounted on another lens of the eyeglass to create a second AR image for a different eye. The laser transmitters may be employed to reflect one or more primary colors to create a color AR image. The micromirrors may be positioned around a center of a wearer's visual field and in distinct locations within each respective lens to prevent overlap in a visual field of the wearer. The transmitted laser signal and the transmitted electrical signal may be coordinated to enable stereoscopic vision.

According to some examples, a method to produce an eyeglass that displays an Augmented Reality (AR) image through a micromirror on the eyeglass is provided. An example method may include mounting a laser transmitter on a proximal surface of a frame of the eyeglass, the laser transmitter coupled to a controller configured to receive AR data to be displayed. The laser transmitter may be configured to transmit a laser signal modulated based on the received AR data onto the micromirror, and the controller may be configured to transmit an electrical signal to a base of the micromirror to cause the micromirror to oscillate. The example method may also include mounting the micromirror on a proximal surface of a lens at a position close to an eye of a wearer and outside of a visual focus of the wearer. The micromirror may be configured to oscillate in correlation with an intensity of the laser signal such that the AR image is created on a retina, of the wearer.

In other examples, a plane mirror may be mounted on a proximal surface of the frame near a hinge of the eyeglass, where the plane mirror may be configured to reflect the laser signal from the laser transmitter to the micromirror. Mounting the micromirror on the proximal surface of the lens may include positioning the micromirror such that a distance between the eye of the wearer and the micromirror is substantially equal to a length of a longest eyelash of the wearer. The micromirror may be incorporated into the proximal surface of the lens to form a single lens piece. An existing eyeglass may be retrofitted by mounting the laser transmitter on the proximal surface of the frame of the eyeglass and mounting the micromirror on the proximal surface of the lens.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually, and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), signal processors (DSPs), or other integrated formats. However, those skilled in the art will recognize that some aspects of the embodiments disclosed herein, in whole or in part, may be equivalently implemented in integrated circuits, as one or more computer programs running on one or more computers e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented utilizing any adhesive commercially available components, such as those typically found in systems to display AR data as an image. The herein described subject matter sometimes illustrates different components contained within, or connected with, different other components. It is to be understood that such depicted architectures are merely exemplary, and that, in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being on associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes hut is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the holds true fix the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to display an augmented reality (AR) image, the method comprising:
   receiving AR data to be displayed at a controller coupled to a laser transmitter positioned on a surface of a frame or temple of an eyeglass;
   transmitting a laser signal, modulated according to the received AR data, onto a plane mirror positioned on the surface of the frame forward from the laser transmitter, such that the transmitted laser signal is returned from the plane mirror onto a micromirror at a particular angle, wherein:
      the micromirror is positioned on a proximal surface of a lens of the eyeglass close to an eye of a wearer and outside of a visual focus of the wearer,
      a reflective surface of the plane mirror is concave,
      a reflective surface of the micromirror is convex,
      the transmitted laser signal has a first diameter where the transmitted laser signal arrives at the plane mirror and a second diameter where the transmitted laser signal arrives at the micromirror,
      the second diameter is smaller than the first diameter, and
      the micromirror includes two or more pairs of electrode plates orthogonally positioned on the micromirror; and
   transmitting an electrical signal to the micromirror to cause the micromirror to oscillate in correlation with an intensity of the transmitted laser signal such that the AR image is projected onto a retina, wherein the electrical signal induces a charge in two opposing pairs of the electrode plates to cause the two opposing pairs of the electrode plates to be attracted or repelled from a charge on a body of the micromirror, such that a periodic torque is created that rotates a reflective surface of the body of the micromirror if the charge on the body of the micromirror is of a single polarity and the two opposing pairs of the electrode plates are driven by an alternating current (AC) voltage.

2. An apparatus to display an augmented reality (AR) image, the apparatus comprising:
   a controller configured to receive AR data;
   an eyeglass;
   a first laser transmitter mounted on the eyeglass and communicatively coupled to the controller, wherein:

the first laser transmitter is configured to transmit a laser signal, modulated according to the received AR data, onto a first micromirror, the first laser transmitter is positioned in front of a hinge on a frame of the eyeglass in response to a determination that the first laser transmitter is configured to directly transmit the laser signal onto the first micromirror, and the first laser transmitter is positioned further back on a temple of the eyeglass in response to a determination that the first laser transmitter is configured such that the laser signal is returned from a plane mirror onto the first micromirror, wherein:

a reflective surface of the plane mirror is concave, a reflective surface of the first micromirror is convex, the laser signal has a first diameter where the laser signal arrives at the plane mirror and a second diameter where the laser signal arrives at the first micromirror, and the second diameter is smaller than the first diameter;

a first lens of the eyeglass, wherein the first micromirror is positioned:

on a proximal surface of the first lens close to a first eye of a wearer and outside of visual focus of the wearer, to scan the laser signal over an iris of the first eye at various angles such that a first AR image appears to be moving over a distance, and to lessen visibility of the micromirror to the wearer; and a second laser transmitter mounted on the eyeglass and communicatively coupled to the controller, wherein the second laser transmitter is configured to transmit another laser signal, modulated according to the received AR data, onto a second micromirror positioned on a proximal surface of a second lens of the eyeglass to create a second AR image for a second eye of the wearer such that a stereoscopic vision is enabled.

3. The apparatus of claim 2, wherein a base of the first micromirror and a base of the second micromirror are configured to receive an electrical signal transmitted by the controller and to oscillate in response to the electrical signal in correlation with an intensity of the laser signal and the another laser signal such that the first AR image and the second AR image are created on a retina.

4. The apparatus of claim 2, wherein the controller is further coupled to one of: a remote unit, a wireless link, and a recorder to receive the AR data.

5. The apparatus of claim 2, wherein the first micromirror and the second micromirror are one of: respectively attached to the proximal surface of the first lens and the second lens with an adhesive material, and respectively incorporated into the proximal surface of the first lens and the second lens to form a single lens piece.

6. The apparatus of claim 2, wherein the first micromirror and the second micromirror are composed of an insulative material.

7. The apparatus of claim 2, wherein a non-reflective surface of the first micromirror and a non-reflective surface of the second micromirror are embedded with electric charges.

8. The apparatus of claim 2, wherein the first micromirror and the second micromirror each comprise two pairs of electrode plates orthogonally positioned on the first micromirror and the second micromirror, respectively, the electrode plates of each pair coupled to alternating current signals to enable oscillation of the first micromirror and the second micromirror.

9. The apparatus of claim 2, wherein a base of the first micromirror and a base of the second micromirror are electrically coupled to one or more wires or one or more strips of a conductive material.

10. The apparatus of claim 2, wherein the first laser transmitter and the second laser transmitter are employed so that one or more primary colors are returned by the first micromirror and the second micromirror to respectively create the first AR image and the second AR image in color.

11. The apparatus of claim 2, wherein the first micromirror and the second micromirror are positioned around a center of a visual field of the wearer.

12. The apparatus of claim 2, wherein the first micromirror and the second micromirror are positioned in distinct locations within each respective lens to prevent overlap in a visual field of the wearer.

13. A method to produce an eyeglass that displays an augmented reality (AR) image through a micromirror on the eyeglass, the method comprising:

mounting a laser transmitter on a proximal surface of a frame of the eyeglass, wherein the laser transmitter is coupled to a controller and is configured to receive AR data to be displayed, wherein the laser transmitter is configured to transmit a laser signal, modulated based on the received AR data, onto the micromirror, and wherein the controller is configured to transmit an electrical signal to a base of the micromirror to cause the micromirror to oscillate;

mounting a plane mirror on the proximal surface of the frame forward from the laser transmitter such that the transmitted laser signal is returned from the plane mirror to the micromirror at a particular angle, wherein:

a reflective surface of the plane mirror is concave, a reflective surface of the micromirror is convex, the laser signal has a first diameter where the laser signal arrives at the plane mirror and a second diameter where the laser signal arrives at the micromirror, and the second diameter is smaller than the first diameter; and mounting the micromirror;

on a proximal surface of a lens at a position close to an eye of a wearer and outside of a visual focus of the wearer, to scan the laser signal over an iris of the eye at various angles such that the AR image appears to be moving over a distance, and to lessen visibility of the micromirror to the wearer, wherein the micromirror is configured to oscillate in correlation with an intensity of the laser signal such that the AR image is created on a retina of the wearer.

14. The method of claim 13, wherein mounting the micromirror on the proximal surface of the lens comprises:

positioning the micromirror such that a distance between the eye of the wearer and the micromirror is substantially equal to a length of a longest eyelash of the wearer.

15. The method of claim 13, wherein mounting the laser transmitter and mounting the micromirror includes:

retrofitting an existing eyeglass by mounting the laser transmitter on the proximal surface of the frame of the eyeglass and mounting the micromirror on the proximal surface of the lens.

* * * * *

UNITED STATES PATENT AND TRADEMARK OFFICE
CERTIFICATE OF CORRECTION

PATENT NO. : 9,761,051 B2
APPLICATION NO. : 14/362583
DATED : September 12, 2017
INVENTOR(S) : Bromer Page 1 of 2

It is certified that error appears in the above-identified patent and that said Letters Patent is hereby corrected as shown below:

In the Specification

Column 1, Line 59, delete "leas close" and insert -- lens close --, therefor.

Column 2, Line 3, delete "to abuse of" and insert -- to a base of --, therefor.

Column 3, Line 1, delete "inter cilia," and insert -- inter alia, --, therefor.

Column 3, Line 22, insert -- As shown in a diagram 100, the example apparatus may include a lens 102 of an eyeglass, a frame 104 of the eyeglass, a laser transmitter 112, and a micromirror 110. When the laser transmitter 112 is aimed to reflect the transmitted laser signal from a plane mirror 108 onto the micromirror 110, the laser transmitter 112 may be positioned further back on the frame 104 near a temple of the wearer of the eyeglass, as illustrated in FIG. 1. When the laser transmitter 112 is aimed to directly transmit a laser signal to the micromirror 110, the laser transmitter 112 may be positioned on a proximal surface of the frame 104 in front of a hinge 106 on the frame of the eyeglass. The micromirror 110 may be positioned on a proximal surface of the lens 102 of the eyeglass. The micromirror 110 may further be positioned outside of the eyeglass wearer's visual focus and with a distance between an eye of the wearer and the micromirror that is, for example, substantially equal to a length of a longest eyelash of the wearer. The example apparatus may also include a plane mirror 108 positioned on the proximal surface of the frame 104, forward of the laser transmitter 112 and near the hinge 106 of the eyeglass. --, as a new paragraph.

Column 4, Line 35, delete "tens of" and insert -- lens of --, therefor.

Column 5, Line 24, delete "my tend" and insert -- may tend --, therefor.

Column 7, Line 47, delete "hut not" and insert -- but not --, therefor.

Column 7, Line 60, delete "hut not" and insert -- but not --, therefor.

Signed and Sealed this
Seventeenth Day of April, 2018

Andrei Iancu
*Director of the United States Patent and Trademark Office*

CERTIFICATE OF CORRECTION (continued)

Column 8, Line 4, delete "abuse of" and insert -- a base of --, therefor.

Column 8, Line 63, delete "etc)" and insert -- etc.) --, therefor.

Column 9, Line 15, delete "radio frequency (RE)," and insert -- radio frequency (RF), --, therefor.

Column 10, Line 22, delete "(the" and insert -- (e.g., the --, therefor.

Column 10, Line 29, delete "TI-IF" and insert -- THE --, therefor.

Column 13, Line 58, delete "signal" and insert -- digital signal --, therefor.

Column 13, Line 64, delete "e.g., as" and insert -- (e.g., as --, therefor.

Column 14, Line 33, delete "medium a" and insert -- medium (e.g., a --, therefor.

Column 15, Line 5, delete "being on" and insert -- being so --, therefor.

Column 15, Line 25, delete "hut is not" and insert -- but is not --, therefor.

Column 15, Line 41, delete "the hold true fix" and insert -- the same holds true for --, therefor.

In the Claims

Column 16, Line 51, Claim 1, delete "signal such" and insert -- signal, such --, therefor.

Column 17, Line 28, Claim 2, delete "of the micromirror" and insert -- of the first micromirror --, therefor.

Column 18, Line 42, Claim 13, delete "micromirror;" and insert -- micromirror: --, therefor.